United States Patent [19]
Ohta et al.

[11] Patent Number: 5,394,248
[45] Date of Patent: Feb. 28, 1995

[54] MAGNETIC RECORDING APPARATUS AND MAGNETIC REPRODUCTS APPARATUS WITH GENERATOR FOR DISTINGUISHABLE SIGNAL MADE DISCRIMINATIONS INFORMATIONS WORDS

[75] Inventors: Yoshihiko Ohta, Yokosuka; Tetsuro Izumi, Yokohama, both of Japan

[73] Assignee: Victor Company of Japan, Ltd., Yokohama, Japan

[21] Appl. No.: 995,095

[22] Filed: Dec. 22, 1992

[30] Foreign Application Priority Data

Dec. 27, 1991 [JP] Japan ................. 3-360621

[51] Int. Cl.⁶ .................................. H04N 5/782
[52] U.S. Cl. ................... 358/335; 358/310; 358/323; 358/311; 360/33.1; 360/13; 360/25
[58] Field of Search ............ 358/335, 310, 311, 320, 358/323, 327; H04N 5/76, 5/782; 360/33.1, 27, 13, 14.1, 14.2, 14.3, 25

[56] References Cited

U.S. PATENT DOCUMENTS 5,140,435 8/1992 Suzuki et al. .................. 358/335

FOREIGN PATENT DOCUMENTS 0393955 10/1990 European Pat. Off. .
62-223877 10/1987 Japan .

*Primary Examiner*—Tommy P. Chin
*Assistant Examiner*—Khoi Truong
*Attorney, Agent, or Firm*—Lowe, Price, LeBlanc & Becker

[57] ABSTRACT

A magnetic recording/reproducing apparatus for recording and reproducing a plurality of discrimination information corresponding to signal modes on a magnetic recording medium by utilizing a control signal. The plurality of discrimination information are indicated by discrimination information words which are determined by removing words, each of which is undistinguishable from the other words when being continuously arranged, from $2^{(2N-2)}$ words each of which comprises 2N bits (N is a natural number equal to or more than 2) whose first bit is fixed to "L" or "S" and last bit is fixed to "S" or "L" and further by removing words which have an intermediate odd bit and the following even bit identical to the last bit and the first bit, respectively, from said $2^{(2N-2)}$ words. This arrangement can record and reproduce both the discrimination information and VISS·VASS information and, in addition, can substantially record the back track prevention information.

9 Claims, 6 Drawing Sheets

FIG. 1A
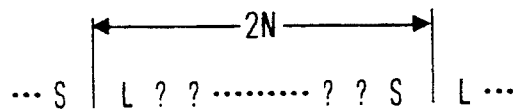
FIG. 1B
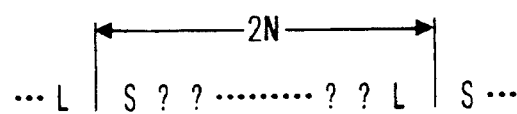
FIG. 1C

MAGNETIC RECORDING APPARATUS AND MAGNETIC REPRODUCTS APPARATUS WITH GENERATOR FOR DISTINGUISHABLE SIGNAL MADE DISCRIMINATIONS INFORMATIONS WORDS

BACKGROUND OF THE INVENTION

The present invention relates to a magnetic recording/reproducing apparatus and a magnetic recording medium.

Recently, a viewing screen is being increasingly widened with propagation of a so-called high-vision system having an aspect ratio of 16:9 and various modes of video signals are taken so as to maintain the interchangeability with the existing 4:3 aspect ratio system. For example, as the signal modes there are known a squeeze mode signal (full mode, shrink mode signal) in which a video signal having the aspect ratio of 16:9 is assigned to all the effective screen lines of a video signal having the aspect ratio of 4:3, a first letter box signal in which the upper and lower portions of a 4:3 aspect ratio screen are blackened in the state that the aspect ratio of 16:9 is maintained, and a second letter box signal in which picture additive information such as vertical resolution correction information is superimposed on the upper and lower portions of the 4:3 aspect ratio screen.

FIGS. 4A to 4C illustrate the states that the aforementioned signals are displayed on the 4:3 aspect ratio screen. FIG. 4(A) shows a screen of a video signal having the existing 4:3 aspect ratio for comparison purposes, FIG. 4(B) shows a screen of the squeeze mode signal where a circle positioned at the center portion of the screen takes a vertical ellipse configuration due to the assignment to all the effective screen lines of the 4:3 aspect ratio screen, and FIG. 4(C) shows a screen of the first or second letter box signal where, unlike the squeeze mode signal, the circle positioned at the center portion of the screen takes a true circle configuration and the upper and lower portions of the screen are blackened so as to maintain the 16:9 aspect ratio. In the case of the second letter box signal, the picture additive information is superimposed on the period corresponding to the black portions.

For coping with the various signal modes, it is desirable that the signal modes are discriminated by a VTR to obtain the discrimination information which is in turn recorded on a control track of a magnetic tape by varying the duty ratio of a control signal to be transmitted to a video apparatus such as a television receiver. In VHS-system home-use VTRs, as means to record information other than servo information by varying the duty ratio of the control signal, there is known a VISS·VASS (Video Index Search System·Video Address Search System) system which records the heading information of a program and others. In addition, a 4-head 270°-winding camera-integrated VTR varies the duty ratio of the control signal to prevent the so-called back track reproduction under the state of maintaining the interchangeability with the aforementioned VISS·VASS system.

FIGS. 5A, 5B and 5C are illustrations for describing the control signal to be used in the VISS·VASS system. FIG. 5A shows a control signal not having the general VISS·VASS information where one period thereof takes the time period corresponding to one frame of a video signal, for example, in the NTSC system, the time period is 1/30 sec and in the PAL system the time period is 1/25 sec. The duty ratio of such a control signal is 50%, while the information necessary as the servo information is only the timing of the rising edge aa. Accordingly, in the VISS·VASS system, the falling edge which is unnecessary as the servo information, is used so that the information is recorded by varying the duty ratio of the control signal. That is, the control signal having a duty ratio of 60% shown in FIG. 5B indicates "0" and the control signal having a duty ratio of 27.5% illustrated in FIG. 5C indicates "1". The heading information of a program, address information and others are recorded by a combination of these numerals.

Secondly, a description will be made with reference to FIGS. 6A to 6F in terms of the prevention of the back track reproduction in the 4-head 270°-winding camera-integrated VTR. In this camera-integrated VTR, a tape pattern illustrated in FIG. 6B is formed by first to fourth magnetic heads H1 to H4 provided on a rotary drum as illustrated in FIG. 6A. In FIG. 6B, first to fourth tracks T1 to T4 respectively correspond to the first to fourth magnetic heads H1 to H4. The recording is effected sequentially with respect to four tracks. Here, the first and second tracks T1 and T2 are referred to as first frame tracks and the third and fourth tracks T3 and T4 are referred to as second frame tracks. However, the control signal is recorded at every single frame, i.e., at every two tracks, and hence there is the possibility of an occurrence of the back track reproduction in which the first frame tracks are reproduced by the third and fourth magnetic heads H3 and H4 and the second frame tracks are reproduced by the first and second magnetic heads H1 and H2. In this case, the reproduction is effected by the magnetic heads different from the magnetic heads used for the recording. This results in the fact that difficulty is encountered to follow the curves of the track patterns inherent to the respective magnetic heads, thus deteriorating the S/N ratio of the reproduced signal. Accordingly, the information indicative of the magnetic head used for recording a specific track from among successive four tracks is recorded in correspondence with the first and second frame tracks by varying the duty ratio of the control signal and then detected at the time of the reproduction so as to control the phase of the magnetic head, which is refered to as 4-track sequence recording and reproducing. Here, for maintaining the interchangeability with the VISS·VASS system, it is required that the varied duty ratio of the control signal is distinguishable from the duty ratio of the VISS·VASS system. Thus, for the prevention of the back track reproduction, the control signals respectively having duty ratios of 62.5% and 30% as illustrated in FIGS. 6C and 6D are taken as "L" and the control signals respectively having duty ratios of 57.5% and 25% as illustrated in FIGS. 6E and 6F are taken as "S", and the repetitions of these "L" and "S" are recorded so as to be distinguishable from "0" and "1" in the VISS·VASS system. That is, the control signal having the duty ratio of 62.5% indicates "0" and "L", the control signal having the duty ratio of 30% indicates "1" and "L", the control signal having the duty ratio of 57.5% indicates "0" and "S", and the control signal having the duty ratio of 25% indicates "1" and "S". "L" and "S" are recorded in correspondence with the first and second frame tracks whereby it is possible to record the 4-track sequence necessary for the prevention of the back track reproduction. With the above-described arrangement, the conventional apparatus realizes the back track reproduction prevention by varying the duty ratio of the control signal in the state of maintaining the interchangeability with the VISS·VASS system.

There is a problem which arises with such a conventional technique, however, in that difficulty is encountered to record the back track reproduction prevention information concurrently with recording the discrimination information due to the discrimination of the signal mode by varying the duty ratio of the control signal and maintaining the interchangeability with the VISS·VASS system. In addition, it is also difficult to offer a recording medium for recording the discrimination information corresponding to the signal mode.

SUMMARY OF THE INVENTION

It is therefore an object of the present invention to provide a magnetic recording/reproducing apparatus and recording medium which are capable of removing the above-described problems inherent to the conventional apparatus.

In accordance with the present invention, there is provided a magnetic recording/reproducing apparatus for recording and reproducing a plurality of first discrimination information and a plurality of second discrimination information on a magnetic recording medium by utilizing a control signal which can take first to fourth duty ratios in synchronism with a video signal, the first and second duty ratios corresponding to "1" and the third and fourth duty ratios corresponding to "0" so as to record and reproduce the plurality of first discrimination information with combinations of "1" and "0" and the first and third duty ratios corresponding to "L" and the second and fourth duty ratios corresponding to "S" so as to record and reproduce discrimination information words with combinations of "L" and "S", and the plurality of second discrimination information corresponding to the discrimination information words obtained by removing words, each of which is undistinguishable from the other words when being continuously arranged, from $2^{(2N-2)}$ words each of which comprises 2N bits (N is a natural number equal to or more than 2) whose first bit is fixed to "L" or "S" and last bit is fixed to "S" or "L" and further by removing words which have an intermediate odd bit and the following even bit identical to the last bit and the first bit, respectively, from said $2^{(2N-2)}$ words.

Further, according to this invention, there is provided a magnetic recording medium in which recorded are a video signal and a control signal taking first to fourth duty ratios which are indicative of a plurality of first discrimination information and a plurality of second discrimination information and which synchronizes with the video signal, the first and second duty ratios corresponding to "1" and the third and fourth duty ratios corresponding to "0" so that the plurality of first discrimination information are indicated with combinations of "1" and "0" and the first and third duty ratios corresponding to "L" and the second and fourth duty ratios corresponding to "S" so that the plurality of second discrimination information are indicated by discrimination information words each comprising a combination of "L" and "S", and the discrimination information words being obtained by removing words, each of which is undistinguishable from the other words when being continuously arranged, from $2^{(2N-2)}$ words each of which comprises 2N bits (N is a natural number equal to or more than 2) whose first bit is fixed to "L" or "S" and last bit is fixed to "S" or "L" and further by removing words which have an intermediate odd bit and the following even bit identical to the last bit and the first bit, respectively, from said $2^{(2N-2)}$ words.

BRIEF DESCRIPTION OF THE DRAWINGS

The object and features of the present invention will become more readily apparent from the following detailed description of the preferred embodiments taken in conjunction with the accompanying drawings in which:

FIGS. 1A to 1C are an illustration for describing discrimination information words according to an embodiment of this invention;

DETAILED DESCRIPTION OF THE INVENTION

Figure 2:
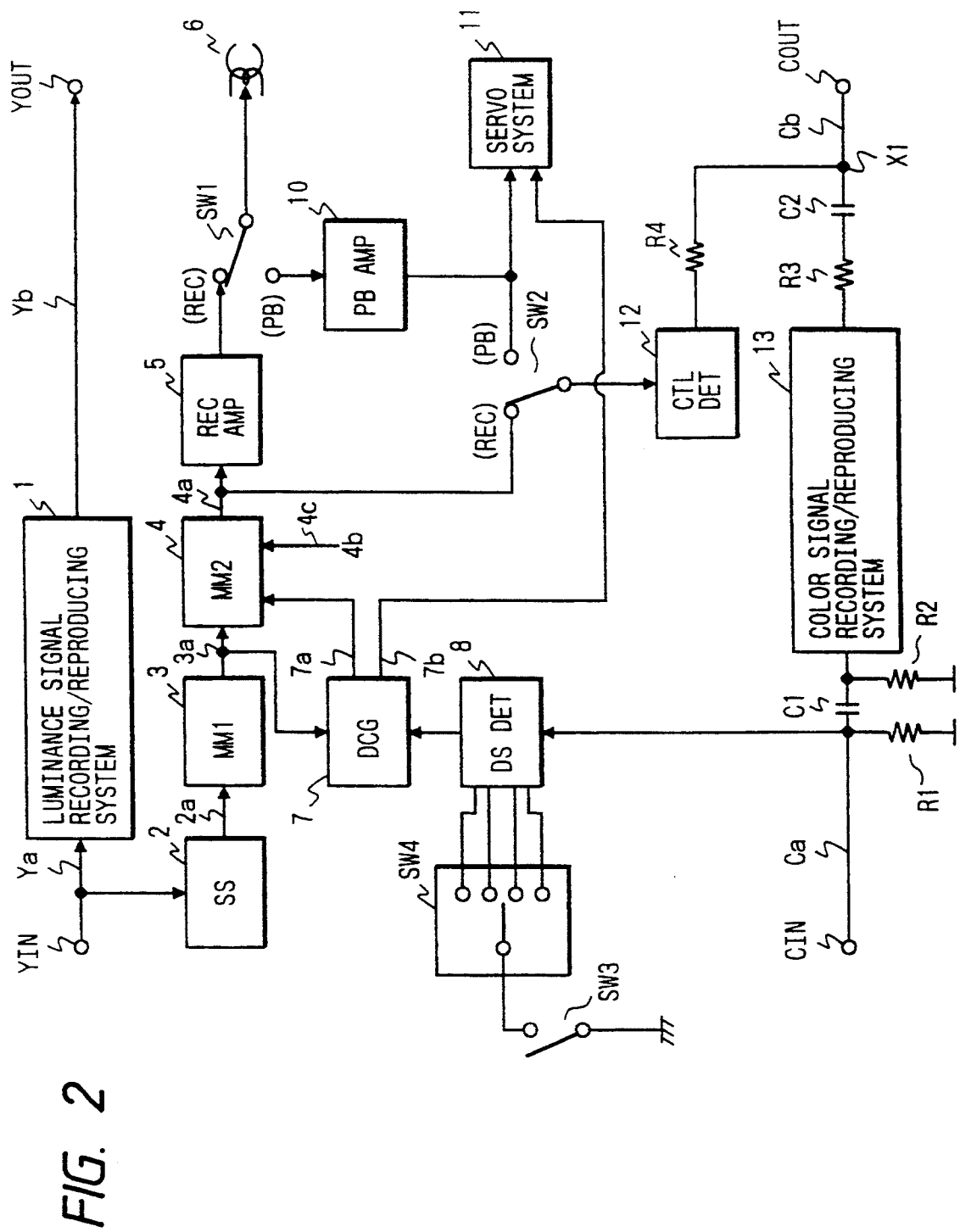
FIG. 2 is a block diagram showing an arrangement of a magnetic recording/reproducing apparatus according to this embodiment.

An embodiment of this invention will be described hereinbelow with reference to FIGS. 1 to 3. In this invention, in order to maintain the interchangeability with the VISS·VASS system, the control signals "L" having the duty ratios 62.5% and 30% and the control signals "S" having the duty ratios of 57.5% and 25%, which are used for the above-mentioned back track reproduction prevention, are combined with each other so as to produce a discrimination information word comprising a plurality of bits, and the discrimination information obtained by discriminating the signal mode on the basis of the discrimination information word is recorded together with the back track reproduction prevention information and then reproduced to be transmitted to the other video apparatus.

Firstly, a description will be made in terms of the discrimination information word having a plurality of bits constructed with a combination of "L" and "S". As the basic conditions for the discrimination information word, there are required a first condition that the discrimination information word has a plurality of distinguishable discrimination information and a second condition that the back track reproduction prevention information is detectable by discriminating the 4-track sequence. Here, for satisfying the second condition, the start of the 4-track sequence is arranged to be in a corresponding relation to the first bit of the word. Further, the same words are repeatedly and continuously recorded for a period that a certain state is taken (for example, in the case that the squeeze mode signal is recorded) and the number of bits per one discrimination information word is set to 2N (N: natural number equal to or greater than 2). For discriminating the first bit on the basis of the successive same discrimination information words, it is required that at least the sign of the last bit and the sign of the first bit are in the opposite or inverted relation to each other (for example, when the first bit is "L", the last bit is "S"). The discrimination information words satisfying the above-mentioned second condition are shown in FIGS. 1A to 1C. That is, the first bit is "L (S)" and the last bit is "S (L)" and the discrimination information word is composed of 2N bits. Still further, although the discrimination information word is required to be distinguishable due to the first condition, since the same discrimination information words are continuously recorded, in the case that there is an inversion from "L (S)" to "S (L)" in the intermediate bit train at location other than the first and last bits, there is a possibility that the start of the discrimination information word is confused so as to be undistinguishable. This will be described hereinbelow with reference to FIG. 1C in terms of the case of N=3. In FIG. 1C, the discrimination information word "LLLSLS" is undistinguishable from the discrimination information word "LSLLLS" because, when "LLLSLS" is repeated as shown in the third pattern "LLLSLSLLLSLS" of FIG. 1C, starting from the fifth bit the pattern includes the word "LSLLLS", the ninth word in FIG. 1C. Similarly, the discrimination information word "LLSLSS" is undistinguishable from the discrimination information word "LSSLLS" starting from the fourth bit of the repeated pattern "LLSLSSLLSLSS" at the sixth pattern of FIG. 1C, the discrimination information word "LLSSLS" is undistinguishable from the discrimination information word "LSLLSS" starting from the fifth bit of the repeated pattern "LLSSLSLLSSLS" at the seventh pattern of FIG. 1C, and the discrimination information word "LSLSSS" is undistinguishable from the discrimination information word "LSSSLS" starting from the third bit. However of the repeated pattern "LSLSSSLSLSSS" at the twelfth pattern of FIG. 1C, one of these undistinguishable discrimination information words can be used although reducing the distinguishable information. Thus, for eliminating these undistinguishable discrimination information words, one discrimination information word is determined by $2^{(2N-2)}$ discrimination words whose first and last bits are fixed, and discrimination information words respectively starting from the second bit, third bit, . . . , $(N-1)_{th}$ of the determined discrimination information word are assumed in the state that the same determined discrimination information words are arranged successively so as to successively check whether these assumed discrimination information words are coincident with the other discrimination information words. This checking operation is also effected in terms of all the other discrimination information words.

However, since the discrimination information words such as "LLSLLS", "LLSLSS", "LSSLLS" and "LSSLSS" having an odd bit (third bit) and the following even bit (fourth bit) which are identical to the last bit and the first bit, respectively, are undistinguishable as to whether the discrimination information word starts from the initial bit (first bit) or starts from the third bit, they cannot be used because the 4-track sequence is shifted in the case of deciding in error the start of the 4-track sequence which is the above-mentioned second condition. Here, in the case of the discrimination information words having an intermediate even bit and the following odd bit identical to the last bit and the first bit, respectively, even if the decision is made such that the discrimination information word starts from the intermediate odd bit, the 4-track sequence is distinguishable and hence it is possible to use such a discrimination information word. That is, the discrimination information word having an odd bit and the following even bit which are identical to the last and the first bit, respectively, is removed.

Accordingly, for example, the effective discrimination information words to be usable in the case of N=3 are "LLLLLS", "LLLLSS", "LLLSLS", "LLLSSS", "LLSSLS", "LLSSSS", "LSLSLS", "LSLSSS" and "LSSSSS" which are indicated by star marks in FIG. 1C. Thus, the number of the effective discrimination information words which can be recorded is 9. Further, in the case of N=2, for example, the usable effective discrimination information words are "LLLS", "LLSS", "LSLS" and "LSSS" and the number thereof becomes 4.

The conditions for the usable effective discrimination information word are as follows:

(1) the discrimination information word comprises a bit train of 2N bits (N is an integer equal to or more than 2);

(2) the first bit sign and last bit sign of the word are in a predetermined inverted relation to each other;

(3) one word is picked up from $2^{(2N-2)}$ discrimination information words, whose first and last bits are fixed, to assume discrimination information words respectively starting from the second bit, third bit, . . . , $(2N-1)_{th}$ bit of the determined word in that state that the same picked-up words are arranged successively so as to successively check whether the assumed discrimination words are coincident with the other discrimination information words, and this checking operation is effected in terms of all the other discrimination information words, thereby removing the undistinguishable discrimination information words; and (4) the discrimination information word having an intermediate odd bit and the following even bit which are identical to the last bit and the first bit, respectively, that is, a word having the same inversion between an intermediate odd bit and the following even bit as the inversion between adjoining words, is removed.

That is, as the effective discrimination information words there are used the bit trains obtained by removing the words, each of which is undistinguishable from the other word when being continuously arranged, from $2^{(2N-2)}$ words each of which comprises 2N bits (N is a natural number equal to or more than 2) whose first bit is fixed to one of "L" and "S" and is opposite in sign to the last bit (for example, when the first bit is "L", the last bit is "S") and further by removing the words, which have an intermediate odd bit and the following even bit identical to the last bit and the first bit, respectively, from the $2^{(2N-2)}$ words.

Secondly, a description will be made with reference to FIG. 2 in terms of a VTR which records and reproduces the discrimination information on the basis of the usable effective discrimination information words which satisfy the above-mentioned (1) to (4) conditions and which transmits the discrimination information to the other video apparatus. Here, as examples of the discrimination information there are assumed 4 kinds of signals: the general video signal, squeeze mode signal and first and second letter box signals, and the above-mentioned discrimination information words are words having a value of N which equals 2. Further, the discrimination information is transmitted through a color signal terminal of the so-called S-signal modulated by a color subcarrier frequency, which does not include low-frequency components, and transmitted. The discrimination information signal is frequency-separable from the color signal.

In FIG. 2, a video signal is inputted through the so-called S-terminals for the YC separation transmission to this VTR. That is, a terminal YIN is a luminance signal input terminal of the S input terminals, and an input luminance signal Ya of the input video signal is supplied through the luminance signal input terminal YIN to a luminance signal recording/reproducing system 1 and a vertical synchronization separation circuit 2 (SS). Further, a terminal CIN is a color signal input terminal of the S input terminals, and an input color signal Ca of the input video signal is supplied through the terminal CIN to one terminal of a resistor R1 whose other terminal is connected to a ground connection. This input color signal Ca is supplied from the other video apparatus with a dc output impedance which is the same as a resistor R4 (10 kΩ) and an ac output impedance which is the same as a resistor R3 (75Ω). Further, the input color signal Ca is dc-ended by a resistor R1 (100 kΩ) which is an equivalent resistor of the dc input impedance of the VTR and ac-ended by a resistor R2 (75Ω) subsequent to the one terminal of the resistor R1 and a capacitor C1.

Figure 3:
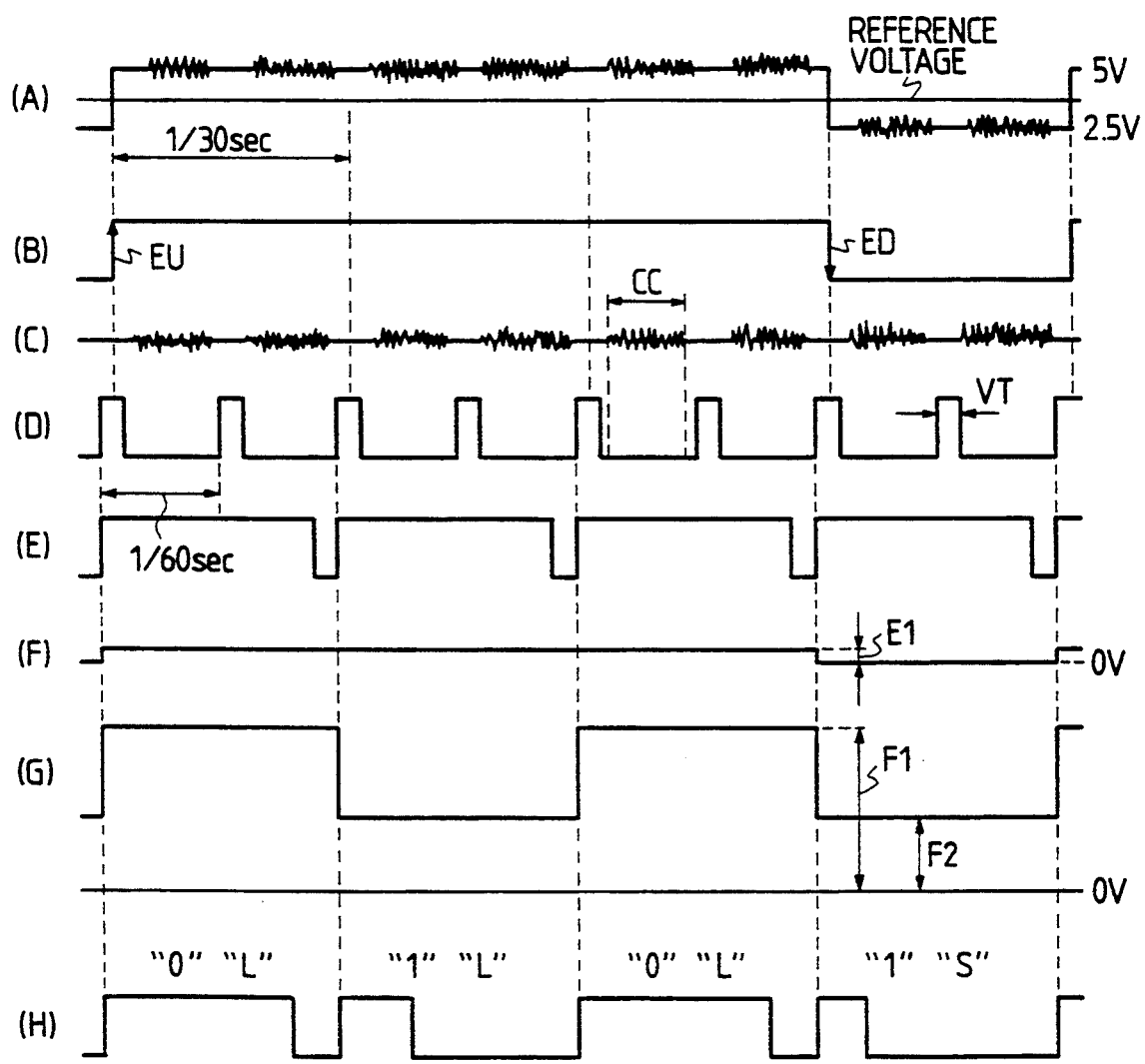
FIG. 3 is a timing chart for describing the operation of the FIG. 2 magnetic recording/reproducing apparatus.
Figure 4A:
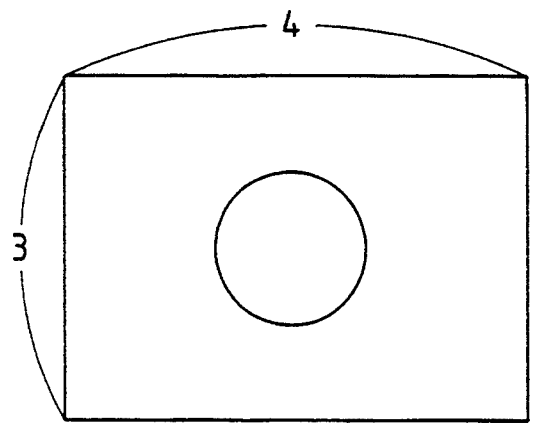
FIGS. 4A to 4C are illustration for describing signal modes.
Figure 4B:
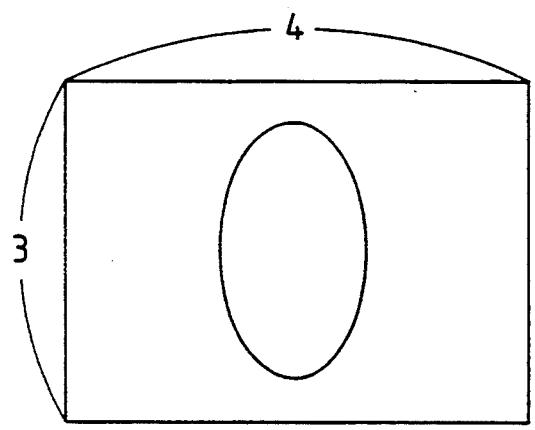
Figure 4C:
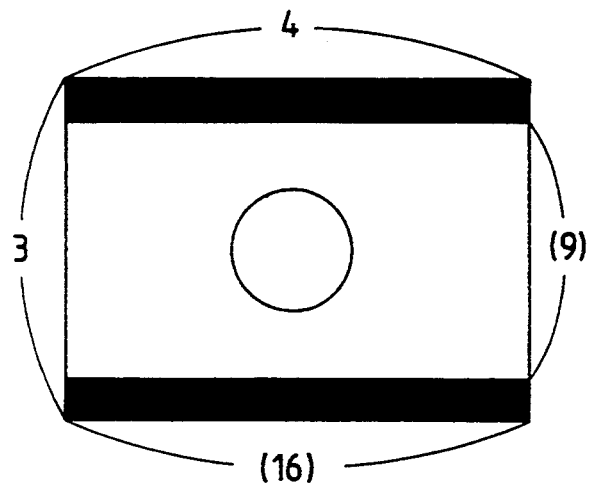
Figure 5A:
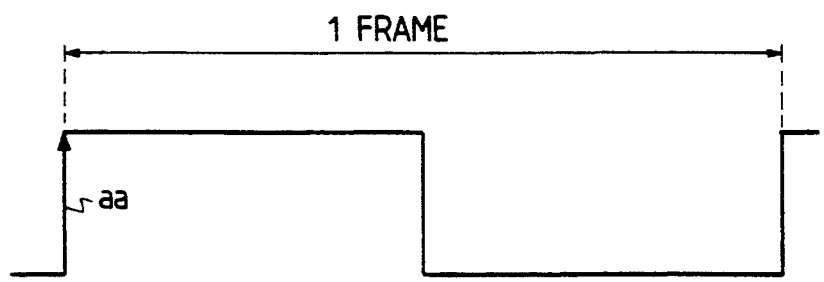
FIGS. 5A to 5C are illustrations for describing a control signal having VISS·VASS.
Figure 5B:
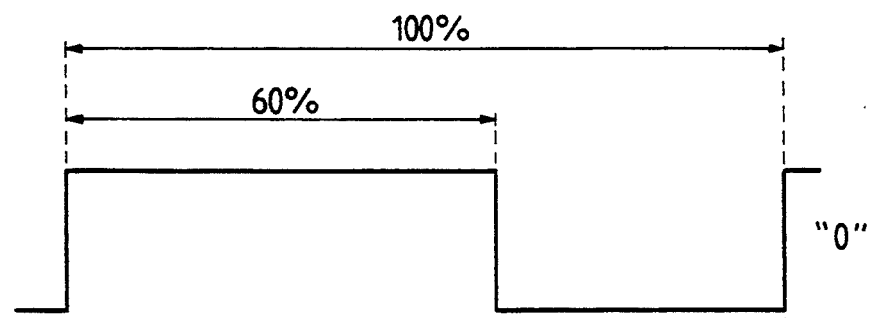
Figure 5C:
Figure 6A:
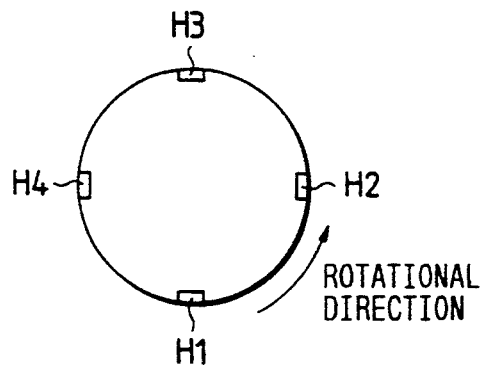
FIGS. 6A to 6F are illustrations for describing the back track reproduction prevention.
Figure 6B:
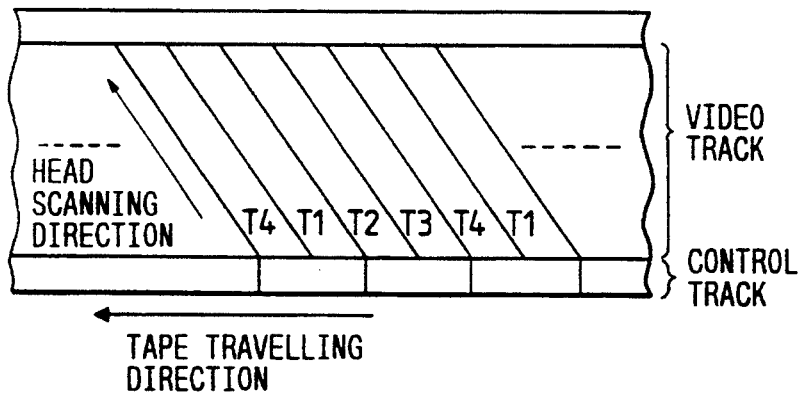
Figure 6C:
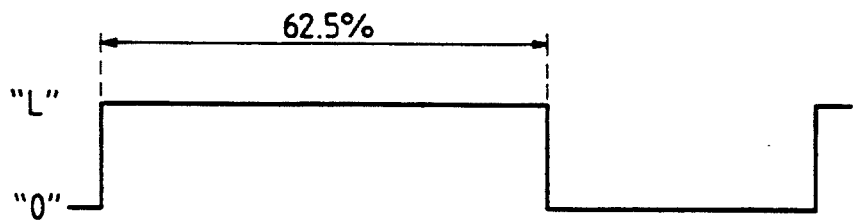
Figure 6D:
Figure 6E:
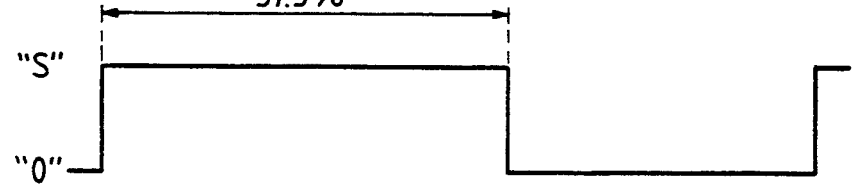
Figure 6F:
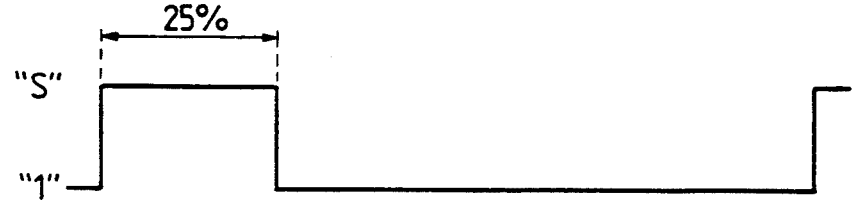

Here, a waveform of the input color signal Ca at the one terminal of the resistor R1 is shown in (A) of FIG. 3. This waveform is formed by superimposing a discrimination information signal indicated in (C) on a color signal indicated in (B). Each of the rising edge and falling edge of the discrimination information signal are set to be generated for a period of the high level, indicated in (D), which corresponds to the output of a vertical synchronization separation circuit 2 (SS) (which will be described hereinafter) and the vertical blanking period VT. Further, this discrimination information signal constitutes one word with 4 bits each corresponding to 1/30 sec (1 frame), which corresponds to "LLLL" in the case of the general video signal, "HHHH" in the case of the squeeze mode signal, "HHHL" ((B) of FIG. 3) in the first letter box signal, and "HLLL" in the case of the second letter box signal.

Returning again to FIG. 2, the input color signal Ca supplied to the one terminal of the resistor R1 is led to a discrimination information decision (detecting) circuit 8 (DSDET) and further to a color signal recording/reproducing system 13 after passing through the capacitor C1 and one terminal of the resistor R2 whose other terminal is grounded. The discrimination information decision circuit 8 compares the waveform shown in (A) of FIG. 3 with a reference voltage (3.75 V) indicated in the same illustration so as to obtain information such as the above-mentioned "LLLL", "HHHH", "HHHL" and "HLLL" which are in turn supplied to a duty ratio control signal generating circuit 7. Here, taking into account the case that the input color signal Ca on which the discrimination information signal is superimposed or the case that the video signal is supplied from a video apparatus, not having the S-terminal output, to an input terminal, not shown, third and fourth switching circuits SW3 and SW4 are provided so that the discrimination information can be recorded by the VTR user. That is, the third switching circuit SW3 is for deciding the manual input and indicates the manual input when taking the closed state. In this state, the fourth switching circuit SW4 becomes effective, and given terminals of the discrimination information decision circuit 8 are grounded through the third and fourth switching circuits SW3 and SW4, whereby the mode of the video signal is supplied to the discrimination information decision circuit 8. On the other hand, in the case that the third switching circuit SW3 takes the open state, the fourth switching circuit SW4 is disregarded.

Thus, the output of the discrimination information decision circuit 8 is supplied to the duty ratio control signal generating circuit 7, thereby determining the duty ratio of the control pulse. That is, the "LLLL" indicative of the general video signal generates a voltage corresponding to "LSLS", the "HHHH" indicative of the squeeze mode signal generates a voltage corresponding to "LLSS", the "HHHL" indicative of the first letter box signal generates a voltage corresponding to "LLLS", and the "HLLL" indicative of the second letter box signal generates a voltage corresponding to "LSSS", thus obtaining a first duty ratio control signal 7a. Here, since the one bit period of the discrimination information signal is set to be equal to the one bit period of the discrimination information word, it is possible to simplify the arrangement of the duty ratio control signal generating circuit 7. In addition, with "HLHL" and "HHLL" being used in place of the discrimination information signals "LLLL" and "HHHH" to be superimposed on the input color signal, it is possible that "H" and "L" constituting the discrimination information signal can respectively correspond to "L" and "S", whereby the arrangement of the duty ratio control signal generating circuit 7 can be simplified.

The first duty ratio control signal 7a is supplied to a second monostable multivibrator 4 and a back track control signal 7b indicative of the start of the word is supplied to a servo system 11, whereby the above-mentioned 4-track sequence can decide the phase of a rotary drum, not shown. Further, the output signal 3a of a first monostable multivibrator 3 to be led to the aforementioned second monostable multivibrator 4 is produced as follows. That is, a vertical synchronization separation circuit output signal 2a ((D) in FIG. 3) with one field period which is separated from an input luminance signal Ya in the vertical synchronization separation circuit 2 and waveform-shaped is supplied to the first monostable multivibrator 3 (MM1) so as to obtain the first monostable multivibrator output signal 3a ((E) in FIG. 3) which rises in synchronism with the vertical synchronization separation circuit output signal 2a, falls after maintaining the high level for a period longer than one field and shorter than one frame, and maintains the low level until the input of the rising edge of the next vertical synchronization separation circuit output signal 2a. This signal is led to the second monostable multivibrator 4 (MM2) so as to produce a control signal 4a which rises in synchronism with the rising edge of the first monostable multivibrator output signal 3a.

Here, a description will be made in terms of the control signal 4a. The time that this signal takes the high level depends upon the voltage obtained with the second monostable multivibrator 4 adding the above-mentioned first duty ratio control signal 7a to a second duty ratio control signal 4b from a VISS·VASS signal generating circuit, not shown. Thus, the lead supplying the control signal 4b is a first discrimination information supplying means. For example, in the case that the first duty ratio control signal 7a has the "LLLS" information and at the same time the second duty ratio control signal 4b has the "0101" information, the waveforms of these first and second duty ratio control signals 7a and 4b become as illustrated in (F) and (G) of FIG. 3. In (F) of FIG. 3, a potential difference E1 corresponds to the time of 5% (=62.5−57.5=30−25) of one period of the control signal 4a, and in (G) of FIG. 3, potential differences F1 and F2 correspond to the times of 57.5% and 25% of one period thereof, respectively. The resulting control signal 4a is shown in (H) of FIG. 3. Thus, with the ratio of the high level and low level of the control signal 4a being modulated by the first and second duty ratio control signals 7a and 4b, it is possible to record both the discrimination information and VISS·VASS information. In addition, since the start of the discrimination information word is coincident with the start of the 4-track sequence for the back track prevention, it is also possible to substantially record the back track prevention information.

Further, the control signal 4a is amplified in a recording amplifier 5 (RECAMP) up to a predetermined level and then supplied through a first switching circuit SW1 (taking the state illustrated) to a control head 6 to be recorded in a control track formed in longitudinal directions of a magnetic tape TT. Further, at the time of the reproduction, the movable contact of the first switching circuit SW1 is switched from the recording side (REC) to the playback side (PB) so that the reproduced control signal 4a is supplied through the first switching circuit SW1 to a playback amplifier 10 (PBAMP) to be amplified up to a predetermined level and waveform-shaped. Thereafter, the reproduced control signal 4a is supplied to the servo system 11 and further to the playback side (PB) of a second switching circuit SW2 so as to be led to a control signal decision circuit 12 (CTLDET) with the movable contact of the second switching circuit SW2 being switched to the playback side (PB). On the other hand, at the time of the recording, the control signal 4a is supplied to the recording side (REC) of the second switching circuit SW2 and then supplied through the movable contact thereof to the control signal decision circuit 12.

The control signal decision circuit 12 detects the discrimination information words from the control signal 4a to produce the above-mentioned discrimination information signal. That is, in response to the input of the discrimination information words "LSLS", "LLSS", "LLLS" and "LSSS", it produces the discrimination information signals "LLLL", "HHHH", "HHHL", "HLLL" and "LSSS" which are in turn supplied through a resistor R4 to a junction point X1 so as to be mixed with the signal outputted from the color signal recording/reproducing system 13 and led through a resistor R3 and a capacitor C2 to the junction point X1, thereby obtaining an output color signal Cb on which the discrimination information signals are superimposed. This output color signal Cb and an output luminance signal Yb outputted from the luminance signal recording/reproducing system 1 are together transmitted through a color output terminal COUT and luminance output terminal YOUT of the output S terminals to a video apparatus such as a TV receiver.

With the above-described arrangement, the VTR can record and reproduce both the discrimination information and VISS·VASS information. In addition, since the start of the discrimination information word is coincident with the start of the 4-track sequence for the back track prevention information, it is also possible to substantially record the back track prevention information. That is, it is possible to offer the magnetic tape having these information.

Here, it is appropriate that in the above-described embodiment the discrimination information is not limited to the kinds of video signals. Further, from a viewpoint of the transmission of the output color signal Cb on which the discrimination information signal is superimposed, it is also appropriate that the VTR is a video signal transmission and input/output apparatus for inputting and outputting the output color signal Cb on which the discrimination information signal is superimposed, a recording VTR or video signal transmission input apparatus such as a television receiver having only the input/output system, or a reproduction VTR or video signal transmission input apparatus such as a video signal generating apparatus having only the output system. Moreover, in the case that the first and second monostable multivibrators 3 and 4 are constructed with digital circuits principally comprising counters or the like, it is appropriate that the first and second duty ratio control signals 7a and 4b are supplied as digital signals.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A magnetic recording/reproducing apparatus, comprising:
    means for recording and reproducing a plurality of first discrimination information signals and a plurality of second discrimination information signals on a magnetic recording medium by utilizing a control signal which can take first to fourth duty ratios in synchronism with a video signal, said first and second duty ratios corresponding to "1" and said third and fourth duty ratios corresponding to "0", so as to record and reproduce said plurality of first discrimination information signals with combinations of "1" and "0" and said first and third duty ratios corresponding to "L", and said second and fourth duty ratios corresponding to "S", so as to record and reproduce discrimination information word signals representing discrimination information words with combinations of "L" and "S", and
    generating means for generating said plurality of second discrimination information signals corresponding to said discrimination information words by:
    removing first words, each of which is undistinguishable from other words when being continuously arranged, from a set of $2^{(2N-2)}$ words each of which comprises 2N bits (N is a natural number equal to or more than 2) whose first bit is fixed to "L" or "S" and last bit is fixed to "S" or "L", respectively; and
    further by removing from said $2^{(2N-2)}$ words second words which have a bit at an intermediate odd bit position and a bit at an immediately following bit position identical to the last bit and the first bit thereof, respectively and by
    generating said plurality of second discrimination information signals only for the words remaining in said set of words.

2. A magnetic recording/reproducing apparatus as recited in claim 1, wherein said generating means operates for removing as a first word any word which, when repeated consecutively, includes a portion of length 2N bits substantially identical to another word and is thus undistinguishable therefrom.

3. A magnetic recording/reproducing apparatus as recited in claim 2, wherein said generating means operates for removing as a second word any word which includes at an odd bit position thereof a bit identical to the last bit thereof and which further includes, at the immediately following bit position, a bit identical to the first bit thereof.

4. A magnetic recording/reproducing apparatus as recited in claim 1, wherein said generating means operates for removing as a second word any word which includes at an odd bit position thereof a bit identical to the last bit thereof and which further includes, at the immediately following bit position, a bit identical to the first bit thereof.

5. A magnetic recording apparatus for recording an input image signal onto a first region of a recording medium and for modifying a duty cycle of a control signal related to the input image signal to record said control signal onto a second region of the recording medium, comprising:

first discrimination information supplying means for supplying a first discrimination information signal including a combination of bits each indicating "0" or "1" in synchronism with a cycle of said control signal;

second discrimination information producing means for producing a second discrimination information signal including a plurality of information words each provided with a combination of 2N bits each representing "L" or "S" in synchronism with the cycle of said control signal, a first bit of the 2N bits being fixed to either "L" or "S" while a last bit is reversed to the first bit, said second discrimination information producing means producing the information words as bit patterns selected so that when one of said information words is repetitively arranged, it is distinguished from each other word of said plurality of information words, excluding information words formed with predetermined patterns beginning at odd bits thereof;

control signal producing means for producing said control signal with a duty cycle which is variable within a range from preselected first to fourth duty cycles, wherein said control signal producing means operates for producing said control signal with a third duty cycle when outputs from said first discrimination information supplying means and said second discrimination information producing means represent "0" and "L", respectively; for producing the control signal with a fourth duty cycle when the outputs from said first discrimination information supplying means and said second discrimination information producing means represent "0" and "S", respectively; for producing the control signal with a first duty cycle when the outputs from said first discrimination information supplying means and said second discrimination information producing means represent "1" and "L", respectively; and for producing the control signal with a second duty cycle when the outputs from said first discrimination information supplying means and said second discriminating information producing means represent "1" and "S", respectively; and recording means for recording the modified control signal on the second region of the recording medium.

6. A magnetic recording apparatus as recited in claim 5, wherein said second discrimination information producing means defines the information words so that when one of said information words is consecutively repeated, each portion of length 2N bits therein differs from each other information word, whereby said one of said information words is distinguished from each other said information word.

7. A magnetic recording apparatus as recited in claim 5, wherein said recording means operates for simultaneously recording said first discrimination information signal and said second discrimination information signal on said second region of the recording medium.

8. A magnetic reproducing apparatus for reproducing signals recorded on a recording medium having a first region on which an image signal is recorded and a second region on which is recorded a control signal which is related to the image signal and has a duty cycle in a range including at least first, second, third and fourth duty cycles and for detecting the duty cycle of the control signal recorded in the second region for reproducing a plurality of information signals, comprising:

color signal reproducing means for separating a low-frequency converted color signal from a signal reproduced from the first region of the recording medium, for frequency-converting the low-frequency converted color signal to a high-frequency converted color signal, and for outputting the high-frequency converted color signal;

control signal reproducing means for reproducing a control signal from the second region of the recording medium;

detecting means, responsive to the control signal reproduced by said control signal reproducing means, for detecting a first discriminating information signal and a second discrimination information signal, the first discrimination information signal including "0" and "1" portions, a "0" portion being provided when the reproduced control signal includes the third or fourth duty cycle and a "1" portion being provided when the reproduced control signal includes the first or second duty cycle, the second discrimination information signal including discrimination information words each including "L" and "S" portions, an "L" portion being provided when the reproduced control signal represents the first or third duty cycle and an "S" portion being provided when the reproduced control signal represents the second or fourth duty cycle, the second discrimination information signal having a bit pattern so arranged that when any of the discrimination information words is repetitively arranged, it is distinguished from each other discrimination information word, excluding information words formed with predetermined patterns beginning at odd bits thereof; and superimposing means, responsive to the second discrimination information signal detected by said detecting means, for producing an output pulse, corresponding to the second discrimination information signal, said output pulse having a rising edge and a falling edge falling within a vertical blanking period of the high-frequency converted color signal, said superimposing means operating for superimposing the output pulse on the high-frequency converted color signal and for outputting the output pulse superimposed on the high-frequency converted color signal.

9. A magnetic reproducing apparatus as recited in claim 8, wherein said control signal reproducing means operates for simultaneously reproducing said first discrimination information signal and said second discrimination information signal from said second region of the recording medium.

* * * * *